United States Patent
Behnke et al.

[19]

[11] Patent Number: 6,097,425
[45] Date of Patent: Aug. 1, 2000

[54] DEVICE FOR MONITORING OVERLOADING OF PRODUCTS FROM WORKING MACHINE TO TRANSPORTING VEHICLE

[75] Inventors: Willi Behnke, Steinhagen; Heinrich Isfort, Dulman; Norbert Diekhans, Gutersloh, all of Germany

[73] Assignee: Claas Kgaa, Harsenwinkel, Germany

[21] Appl. No.: 08/971,605

[22] Filed: Nov. 17, 1997

[30] Foreign Application Priority Data

Nov. 16, 1996 [DE] Germany .............. 196 47 522

[51] Int. Cl.[7] ........................................ H04N 7/18
[52] U.S. Cl. .............. 348/89; 348/120; 56/10.1; 414/340; 460/150
[58] Field of Search .................. 348/61, 86, 89, 348/113, 118, 120, 145, 148, 149; 56/1, 10.1, 10.2 R, 10.2 D, 10.2 E, 10.2 F; 414/340, 345; 460/1, 114, 119, 150

[56] References Cited

U.S. PATENT DOCUMENTS

| | | | |
|---|---|---|---|
| 4,713,685 | 12/1987 | Nishimura | 348/148 |
| 5,670,935 | 9/1997 | Schofield | 348/148 |
| 5,680,123 | 10/1997 | Lee | 348/148 |
| 5,749,783 | 5/1998 | Pollklas | 460/119 |

FOREIGN PATENT DOCUMENTS

| | | |
|---|---|---|
| 1 555 360 | 1/1971 | Germany . |
| 21 00 280 | 5/1979 | Germany . |
| 155 157 | 5/1982 | Germany . |
| 37 23 794 A1 | 1/1989 | Germany . |
| 42 40 094 A1 | 6/1994 | Germany . |
| 44 26 059 A1 | 2/1996 | Germany . |
| 195 31 662 A1 | 3/1997 | Germany . |
| 61-85238 | 10/1984 | Japan . |
| 4-368241 | 12/1992 | Japan . |
| 07186832 | 7/1995 | Japan . |
| 07215130 | 8/1995 | Japan . |
| 07223488 | 8/1995 | Japan . |
| 08268156 | 10/1996 | Japan . |
| WO 91/15924 | 10/1991 | WIPO . |

*Primary Examiner*—Bryan Tung
*Attorney, Agent, or Firm*—Michael J. Striker

[57] ABSTRACT

A device for overloading products from a working machine having a driver's stand to a transporting vehicle has an overloading unit provided in the working machine, and a monitor assembly for monitoring overloading of the product from the working machine to the transporting vehicle, the monitor assembly including an analog monitoring camera associated with the overloading unit and filming an overloading process, an analog control monitor arranged in the driver's cabin of the working machine such that an indication of the monitoring camera is performed by the control monitor, a first microprocessor connected to the monitoring camera and digitalizing a video signal, a second microprocessor to which the video signal is transmitted, and a digitally operating graphic indicator to which the digitalized video signal is transmitted by the second microprocessor for indication. The monitor assembly also includes a telecommunications unit for making ready and transmitting the digitalized video signal to a signal processing device on board the transporting vehicle for display of the video signal.

41 Claims, 3 Drawing Sheets

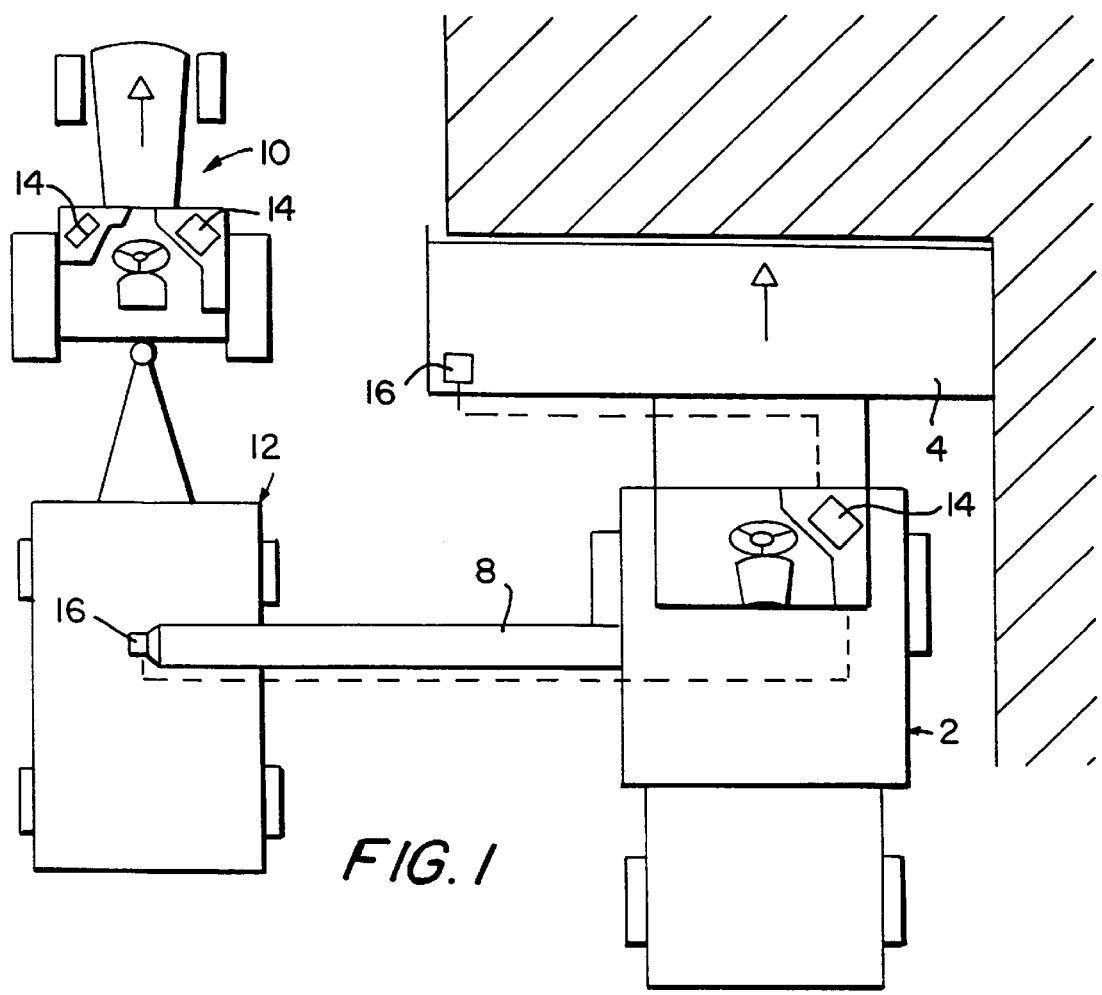
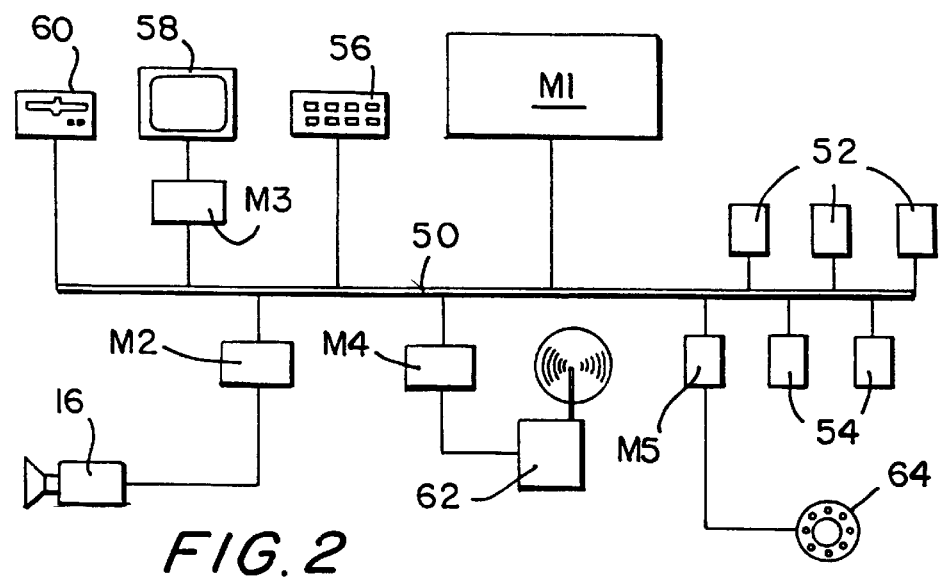

DEVICE FOR MONITORING OVERLOADING OF PRODUCTS FROM WORKING MACHINE TO TRANSPORTING VEHICLE

BACKGROUND OF THE INVENTION

The present invention relates to a device for monitoring overloading of products from a working machine to a transporting vehicle, in particular overloading by an agricultural harvester, wherein the working machine is provided with an overloading device and an analog monitoring camera is associated with the overloading device, films the overloading process, and indicates the results with an analog control monitor arranged in the driver's cabin of the working machine.

Such a device is disclosed for example in the German patent document DE 44 26 059 for a self-propelling forage harvester. It makes possible for the driver to provide a continuous control of the filling of a trailer pulled by a tractor, with a chopped product, with the use of a monitor arranged in the driver's cabin. The monitor is arranged in the field of observation of the driver so that it can observe a field located in front of its machine without turning his head. However, a separate video monitor must be installed to indicate the image transmitted from the video camera. The additional indicating monitor causes however additional costs, limits the movement freedom in the cabin, and influences the vision outside. The driver of the forage harvester can influence the loading of the accompanying trailer by change of its traveling speed and/or by an adjustment of the upper discharge chute or the upper discharge flap. With the actual capacity of the trailer, its obtained loading, and the total weight of the transportation vehicle resulting from the filling, the driver of the harvester can not however make an accurate judgment, since he does not know its carrying capacity, especially during harvesting with the use of several transportation vehicles. The personal responsibility for the loading condition of the transporting vehicle, in particular when it is used on open streets and roads on its travel to silo, lies on the driver of the transporting vehicle. This is however difficult to provide that the transporting vehicle is also uniformly distributed and loaded only to the upper limit of the permissible total weight. For this purpose, the driver must look rearwardly very often so that after long time of use he is overwhelmed, since the driver must also carefully monitor that the vehicle driven by him does not collide with the harvester.

German patent document DE 1 555 360 discloses an agricultural pulling machine or a construction vehicle, in which the driver of a pulling machine can monitor working devices as to their functions by a video device. In the drawings of this patent also a control monitor is shown, which is mounted additionally in the cabin. The control of overloading processes is not disclosed in this document.

German patent document DD 15 157 describes a positioning device between harvesters and transporting vehicles. In order to avoid collisions and overloading losses, it is proposed to determine and indicate both the relative position of the vehicle relative to one another and also to control the transfer element. The described positioning device is however very expensive, since it includes a plurality of individual components.

Generally speaking, all devices disclosed in the prior art have the disadvantage that they operate with obsolete analog technique which is slow, expensive and complicated to install and which also is no longer adaptable to the board electrical system of working machines and transporting vehicles operating with digital technology.

SUMMARY OF THE INVENTION

Accordingly, it is an object of present invention to provide a device for monitoring overloading of products from a working machine to a transporting vehicle, which avoids the disadvantages of the prior art.

More particularly, it is an object of present invention to provide a device for monitoring overloading of products from a working machine to a transporting vehicle, which is integrateable in digital electronic control systems.

It is also an object of present invention to provide such a device for monitoring overloading of products from a working machine to a transporting vehicle, with which the monitoring device can be utilized by several drivers of working machines and transporting vehicles.

In keeping with these objects and with others which will become apparent hereinafter, one feature of present invention resides, briefly stated, in a device in which a microprocessor with a decoder is connected to an analog monitoring camera, and digitalizes the analog video signal and transmits it to another microprocessor, which brings the digitalized video signal to a digitally operating graphic indicator for indication.

In accordance with a preferable embodiment, the digitally operating graphic indicator can indicate at least an operational data and/or control data of the working machine. It does not matter whether the graphic indicator is black and white or colored.

The decoder can be provided in a microprocessor which is associated with the graphic indicator, so that first an analog video signal is transmitted to the microcomputer associated with the graphic indicator, or a digitalized video signal is transmitted which is again transmitted by the microcomputer associated with the graphic indicator in a format utilizable for the graphic indicator. It is important to produce a video signal which in its digitalized format makes possible a useable representation on the digitally operating graphic indicator. By the digitalization of the video signal of the monitoring camera it is possible to indicate the video image received from the monitoring camera completely or sectionally in windows of the graphic or control indicators available in series on the working machine, whose indication is generated in image form by a computer, for example on liquid crystal image screens.

In accordance with a further embodiment of the invention, the monitoring camera is connected through a microprocessor to a CAN-bus network or a high speed bus system of the working machine and transmits the video image data through the CAN-bus network or the high speed bus system directly to the decoder located at another location, of the microprocessor associated with the control device or the indicating device.

Because of the inventive arrangement, indicating image screens for the video image are superfluous and the indicating image screen must not be separately expensively connected by cables. Such a monitoring device is easily integratable into a digitally operating board electronic system. The driver is unloaded since he must observe not several image screens in addition to the working field located in front of him, but only one image screen in which simultaneously the video image and the important machine data and working parameters of the working machines are indicated. Moreover, its vision field is not limited by additional monitors.

The proposed device can be used in different working machines, in which products must be transferred to the transporting vehicles, such as for example agricultural harvesters in form of forage harvesters, combine harvesters, sugar beat harvesters or construction machines such as asphalt millers or tar machines in which the working machine is loaded with material from the transporting vehicle. The inventive device can be however used in the same way for an opposite overloading process. The term "overloading device" is utilized here to cover all technical known overloading means, and not only grain tank emptying tubes with integrated conveyor augers, upper discharge chutes in forage harvesters or bar chain conveyors in sugar beat harvesters, but also band conveyors, scoop conveyors, blow conveyors and other transporting means.

In accordance with a preferable embodiment of the invention, the decoder transmits the analog video signal of the monitoring camera in a standard format on the basis of a digital parallel bus of a board computer. Preferably, the digital parallel bus is a so-called PCMCIA connector which makes possible the use of cost-favorable PC standard components. For the indication of the digitalized video signal on the graphic indicator, the window technique can be utilized. This means that the available indicating field of the graphic indicator is subdivided into partial regions so that a special indicating function is associated with the corresponding partial region. In addition to the window for the video signal, for example additional windows can be provided which indicate the motor data of the working machine such as a rotary speed, oil and cooling water temperatures, adjustment of working tools of the working machine such as working height, cutting length, rotary speed, instruction data of the presently operated instruction such as areas processed or to be processed, overloading product quantity, working time, traveling path covered and to be covered, etc., with clock symbols, pictograms, numerical data, etc.

Several windows for the video signals can be provided as well, when several monitoring cameras are installed or one video image window can be filled in accordance with a selection of the driver of the working machine with one of the video images of the several monitoring cameras. It can be advantageous to install several monitoring cameras on one working machine when not only the overloaded process, but also other functions which can be monitored optically only with high expense must be monitored by the driver of the working machine, such as for example a correct lateral distance to other vehicles, a space behind the working machine during reverse travel, or coupling or uncoupling of trailers, observing the working results of the working tools of the working machine, or following a processing edge with the working tools. For such applications the proposed arrangement and method can be used in an equivalent manner.

The arrangement of the indicator of video images and sensor and/or operation data of the working machine near each other on a graphic indicator is possible without any interferences especially when the computer element which controls the graphic indicator is available through a standardized interface, through which all data and images to be indicated are transmitted. The computer element can then combine the individual indicating fields to an indicating image by a software control, which completely fills the indicating field of the indicating device. Moreover the computer element can carry out software controlled changes or completions of the indicating field, which extend beyond the pure indication of the transmitted video signals or sensor signals. It is adjustable so that the individual operational or sensor data of the working machine or interpretation aids for video image such as for example directional arrows for indication of main transporting direction of the overloading product or limiting lines inside which a loss-free overloading is possible, can be brought into the video image, or warning messages in the case of reaching or exceeding the limiting values can be blended in the image.

Since a CAN-bus network or a high speed bus system are available only through limited data transmission capacities, it can be advantageous to transmit the video image signals not through the CAN-bus network, but directly to the microprocessors connected with the indicators. For this purpose, the analog or digital video signals of the monitoring camera can be transmitted to a microprocessor M2 which is directly connected to or integrated in the microprocessor M1 or M3, and/or to the microprocessor M4.

Moreover, there is the advantage that the digitally provided video images can be easily inquired and transmitted through telecommunication means, further processed by an image recognition software, and the image signals are connectable with further digital informations, such as for example through a predetermined load or switch conditions of the working machine. In order to be capable of transmitting a video image for controlling the overloading from the working machine to a transporting vehicle, it is necessary that the board electronic system of the working machine transmit the digitalized video signals through telecommunication means through one or several transporting vehicles, the telecommunication means of a transporting vehicle make ready the digitalized video signals of the board electronic system, and the indication of the digitalized video signals is performed on a digitally operating graphic indicator of the transporting vehicle. The monitoring device on a transporting vehicle can be build in correspondence with the predetermined layout for a working machine, and correspondingly for example the digital video signals are transmitted from the telecommunication unit through a CAN-bus network to a graphic indicator and from there indicated in a window, or the digital parallel bus on the transporting vehicle can be a so-called PCMCIA connector.

A transporting vehicle can be for example a field tractor with one or several suspended trailers, a truck pulling machine such as a saddle tractor with a suspended support tractor or other transporting vehicles. The graphic indicators can be either LCD image screens which are installed in series in a board network of the field tractors or the tracks, or portable board computers which are utilized for agricultural application for controlling attached devices on the basis of standardized agricultural bus systems and connected releasably with the field tractor. The portable board computers are also available partially through a telecommunication module so that they are suitable in a special way for the communication with the working machine. The driver's cabin of the transporting vehicle can also transmit the digitalized video images through the telecommunication means to an available control screen, selectively also with information of switching on and switching off the working organs of the working machine and/or the transferring elements, steering movements of the working machine as a whole and/or turning movements of the transferring elements, the traveling speed of the working machine, and/or sensor data for properties of the overloading products, such as for example their weight, moisture, charge or instruction number, transport destination, etc.

For the processing of the video signals of the monitoring camera for indication on the transporting vehicle, the above mentioned solution for the indication of the working machine is correspondingly applicable. Also, it can be provided that the control electronic system of the transporting vehicle is available through input means, such as for example attached screen-image screen with graphic user service or a keyboard, from which the adjustment commands of the driver of the transporting vehicle can be transmitted to the transfer device of the working machine by the telecommunication means on the board electronic system of the working machine for execution. When the signals of the adjustment commands for the transfer device of the working machine signal are transmitted to the driver of a transporting vehicle, the indication of a video signal on an image screen of the working machine is no longer absolutely necessary. In such a case the output can be carried out also only on the graphic indicator of one or several transporting vehicles. Because of the inventive indication of the video signal on a graphic indicator in the driver's cabin of the transporting vehicle, the driver can no longer look constantly for observing the performance of the loading process, and the observation from above from the view of the transfer device is possible much better than from the driver's cabin of the transporting vehicle, since the view there is substantially limited by the loading board walls, etc. Also, in the transporting vehicles, the installation of an additional indicating image screen can be dispensed with, so as to lower the costs and the space consumption and to improve the visibility in the cabin of the transporting vehicle.

Since in most cases more than one transporting vehicle participates in the work, preferably the driver's cabins of several or all participating transporting vehicles are provided each with a graphic indicator which can indicate at least operational and/or control data of the transporting vehicle and is connected through telecommunication means with the monitoring camera of the working machine, such as for example a forage harvester, a combine harvester or a construction machine. For controlling the filling of the trailer through a graphic indicator by the driver of the transporting vehicle, it is not necessary to equip each individual transporting vehicle with a monitoring camera in the case of the proposed device, since all transporting vehicles are connected to the monitoring camera of the working machine. This has further the advantage that the transporting vehicle which is located in waiting position can foresee and decide itself at which point an emptying vehicle must start to release the vehicle to be loaded in a moment without interrupting the working process itself.

Instead of a monitoring camera which provides an analog video signal, naturally also it is possible to use a monitoring camera which outputs a digital video signal. In this case the decoder is either completely dispensed, or it is replaced with a decoder which converts the digital video signal into a standard format which can be further processed in a bus network or the vehicle computer.

In the digitally operating graphic indicator a striking point can be blended in, which shows the approximate striking point of the overloading product in the region of the image, the digital or digitalized video signals of a monitoring camera can be processed by an image evaluating software, and vectors, corner angles, warning or arrow signals or other symbolic representations or adjusting command proposals derived from the digitalized video signals can be indicated on the digitally operating graphic indicator. An image evaluation is supported with the use of a three-dimensionally operating video camera, for example an infrared camera, since such a video camera supplies video signals which are better evaluatable in computerized manner. An image evaluation can determine the relative movement of the vehicles to one another and convert into the adjustment command proposals which are indicatable through image signals. When an adjusting command proposal derived from an image evaluation is produced, then in accordance with a selection it can be automatically carried out by the board electronic system. For this purpose the image evaluating software outputs a corresponding adjustment through a microprocessor, which is addressed to the corresponding actuator.

An image evaluation can be associated with a monitoring camera or a microprocessor which is functionally connected with the monitoring camera. The digital video signal outputted on the bus network or a microprocessor from the image evaluation is reduced to the striking points, proposal signals, vectors, corner angles, warning signals or similar symbolic representations. The digitally operating graphic indicator can transmit from a microprocessor symbolic representations and/or adjusting command proposals, which are derived from an image evaluation in connection with the connected or exclusive evaluation of the sensor data of optical, acoustic or radiation sensors.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a working machine provided with a device for monitoring overloading of products in accordance with the present invention;

FIG. 2 is a view showing a circuit diagram for integration of a video signal in a board electronic system;

DESCRIPTION OF PREFERRED EMBODIMENTS

Figure 3:
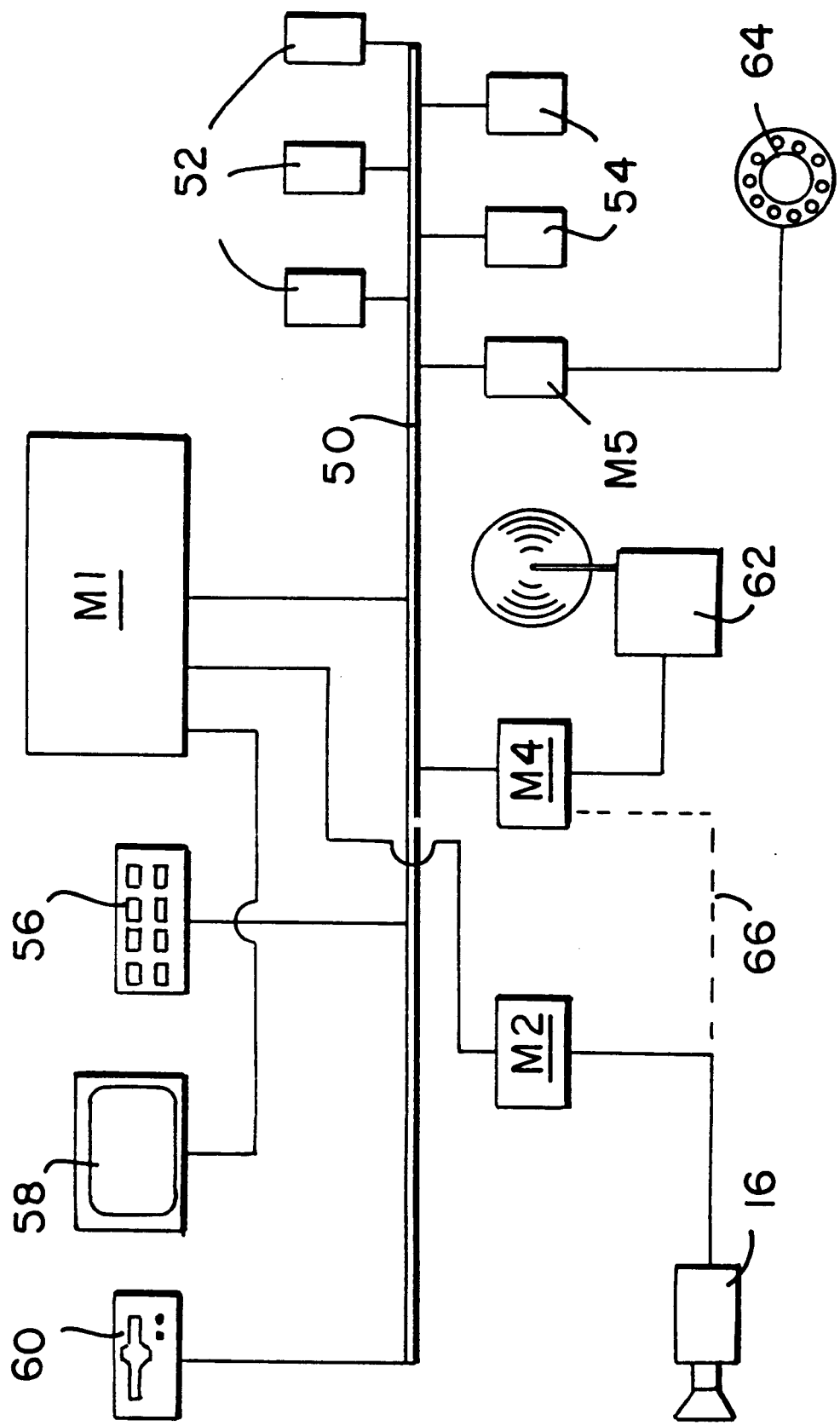
FIG. 3 is a view showing a circuit diagram in accordance with another embodiment of the present invention.

FIG. 1 shows a combine harvester 2 which has a cutting mechanism 4 for mowing a not harvested field area 6. The grain is separated from the moved harvested product, cleaned, and after intermediate storage in a grain tank, is discharged through a grain tank discharge tube 8 into a transporting vehicle. The transporting vehicle here is composed of a field tractor 10 and a trailer 12. For the efficiency of the use and the impact force of the combine harvester 2, it is important that the combine harvester during the time period of overloading of the threshed and cleaned grain to the transporting vehicle 10, 12 is not maintained stationary, but instead the overloading process is performed during the travel. For working machines formed as a forage harvester or a construction machine formed as a strip miller they must necessarily be overloaded during the travel, since in connection with the treatment, so much product to be overloaded is produced that an intermediate storage is no longer possible.

For avoiding a loss of the products to be overloaded or an unfavorable loading of the transporting vehicle, the driver of the combine harvester 2 and the transporting vehicle 10, 12 must control the overloading process. For all participating drivers the control is a difficult task since on the one hand the driver must drive forward its vehicle and on the other hand he must control overloading rearwardly or laterally and must coordinate opposite sides to guarantee an optimal loading as well as to prevent collisions of the vehicles with one another. The driver's cabins of the combined harvester 2 and the transporting vehicle 10 are provided with control instruments which, in addition to the various switches and keys, also include image screens 14 formed as graphic indicators. Thereby the driver is informed about the speed, number of revolutions of the motor and working organs, adjustments of the machine, service intervals, control tips, working parameters and others in graphic and/or alpha numerical indicators. One or several indicators can be represented on the image screen 14, and the indicator image by selection of the driver or automatically can change the working function of the combine harvester 2 or the transporting vehicle 10 to supply the informations corresponding to the requirements.

The image screen 14 is connected with the board electronic system of the combined harvester 1 and the transporting vehicle 10 through electrical or optical conductors. The board electronic system transmits the values which are determined by the sensor system and are to be indicated in a known manner. In addition, externally available informations are indicated on the image screen 14 through telecommunication means connected to the board electronic system. For such a board electronic system, a bus system in which the informations to be exchanged are transmitted through an integrated data format from the sender to the receiver, is especially suitable. In order to make possible monitoring of the overloading process, a monitoring camera 16 is arranged on the grain tank discharge tube and connected with the combine harvester 2. The combine harvester 2 determines through a further monitoring camera 16 which is connected also to the board electronic system and is controlled by it, whether it travels along the stand edge in an optimal manner.

FIG. 2 shows a diagram which represents a possible integration of a monitoring camera 16 in the board electronic system. The high speed network in form of a series bus network 50 is controlled from the bus terminal M1 so that a microprocessor monitors the communication of the further components of the board electronic system which are also connected to the CAN-bus network. The further components shown in FIG. 2 can include sensors 52, actuators 54, a control keyboard 56, a graphic indicator 58, a CD ROM or other external memory 60, a monitoring camera 16, a telecommunication unit 62 and a CAN-bus network-connection socket 64. While all above mentioned components are connected through a microprocessor with the CAN-bus network, for some components the corresponding microprocessors for detailed explanation are identified as microprocessors M2–M5.

The microprocessor M2 has, in addition to devices for the communication with other microprocessors, at least one additional decoder which digitalizes the analog video signals of the monitoring camera 16 transmitted in the television standard format NTSC, pal secam or similar standard formats. Selectively, the decoder can be naturally also directly integrated in the monitoring camera 16. The decoder composed of a suitable hardware and software converts the analog video signal in a digital standard format which then can be further processed by the connected microprocessors M1, M3, M4 and/or M5. The PCMCIA data format is preferable as a standard format. When the monitoring camera 16 supplies digital video signals, the decoder can be used for adaptation of the data format, for example to PCMCIA. When the monitoring camera 16 supplies the video signals in the passing data format, the microprocessor M2 can retransmit the video signals without reformatting.

The digitalized video signals are addressed from the microprocessor M2 within the frame of the data format on the microprocessor M3 which controls the graphic indicator in the image screen 58. The microprocessor M3 reads the digitalized video signals in a software controlled manner from the transmitted data sets, joins them depending on the command signal of the driver of the working machine 2 or the transporting vehicle 10 within the frame of the graphic indicator, and transmits to the image screen 58 an electronic image signal which corresponds to the graphic indicator desired by the driver. The microprocessor M3 can be provided with instructions from the driver through a directly connected keyboard, the control keyboard 56 or a correspondingly equipped attached image screen 58 with a corresponding menu-controlled consumer guide, which informations must be available through the graphic indicator. Thereby the driver can determine, whether he can indicate generally one video signal or video signals in the case of several connected monitoring cameras, or the video signals exclusively or together with other informations must be represented on the graphic indicator, such as for example throughput data or other production data of the working machine 2.

The diagram shown in FIG. 2 is applicable not only for a working machine 2, but also in the same or similar manner for the transporting vehicle 10. The difference for a transporting vehicle 10 is that the digitalized video signal is made available not by the microprocessor M2 which is connected with the monitoring camera 16, but instead by a microprocessor M4 connected with the telecommunication means 62. For making ready the digitalized video signal for the microprocessor M3 of the transporting vehicle 10, the microprocessor M2 of the transporting vehicle 10 must produce through the telecommunication means 62 connected to it a communication connection with the telecommunication means 62 and the microprocessor M4 of the working machine 2 with command and software control. The microprocessor M4 on the working machine 2, must then inquire the digitalized video signals from the microprocessor M2 and transmit the same to the transporting vehicle 10. When the microprocessor M4 of the transporting vehicle 10 has the digitalized video signal, then in the same way as described for the microprocessor M2 it can be transmitted to the microprocessor M3, and the digitalized video signal is brought on the image screen 58 for indication. In addition to a video signal of a monitoring camera which is retransmitted through the telecommunication means and the microprocessor M4 to the board electronic system, simultaneously additional monitoring camera 16 on the working machine 2 or the transporting vehicle 10 can be connected to the bus network 50 either directly through a further microprocessor M3 or, for example when it is installed on a trailing vehicle, through the signal socket 64.

FIG. 3 shows a modification of a bus network 5 in which the digitalized video signals are supplied in another manner than shown in FIG. 2 and brought for indication. The monitoring camera 16 is connected with the microprocessor M2 in FIG. 3 not through the bus network 50, but directly to the microprocessor M1. The microprocessor M1 transmits the indication signals to the image screen 58 not through the bus network 5, but instead directly. Such an arrangement has the advantage that the greater data quantities can be transmitted, since the transmission in the data format of the bus network 50 can be dispensed with. Also, the bus network 50 is less loaded. The microprocessor M2 can be integrated in the microprocessor M1 so that the monitoring camera 16 transmits an analog video signal to the microprocessor M1. The analog video signal or the video signal digitalized by the microprocessor M2 can be integrated by the microprocessor M1 with software control in the indicator image for the image screen 58, which can contain also other data transmitted from the bus network 50 and then transmitted to the image screen 58. Also, it can be advantageous to transmit an analog video signal through the telecommunication means 62, which is then digitalized in the board network of the receiving machine 2, 10, 12. For this purpose, the monitoring camera 16 is connected through a conductor 66 with the microprocessor M4, through which the analog video signal is transmittable to the microprocessor M4 directly or analogously from the telecommunication means 62.

Figure 4:
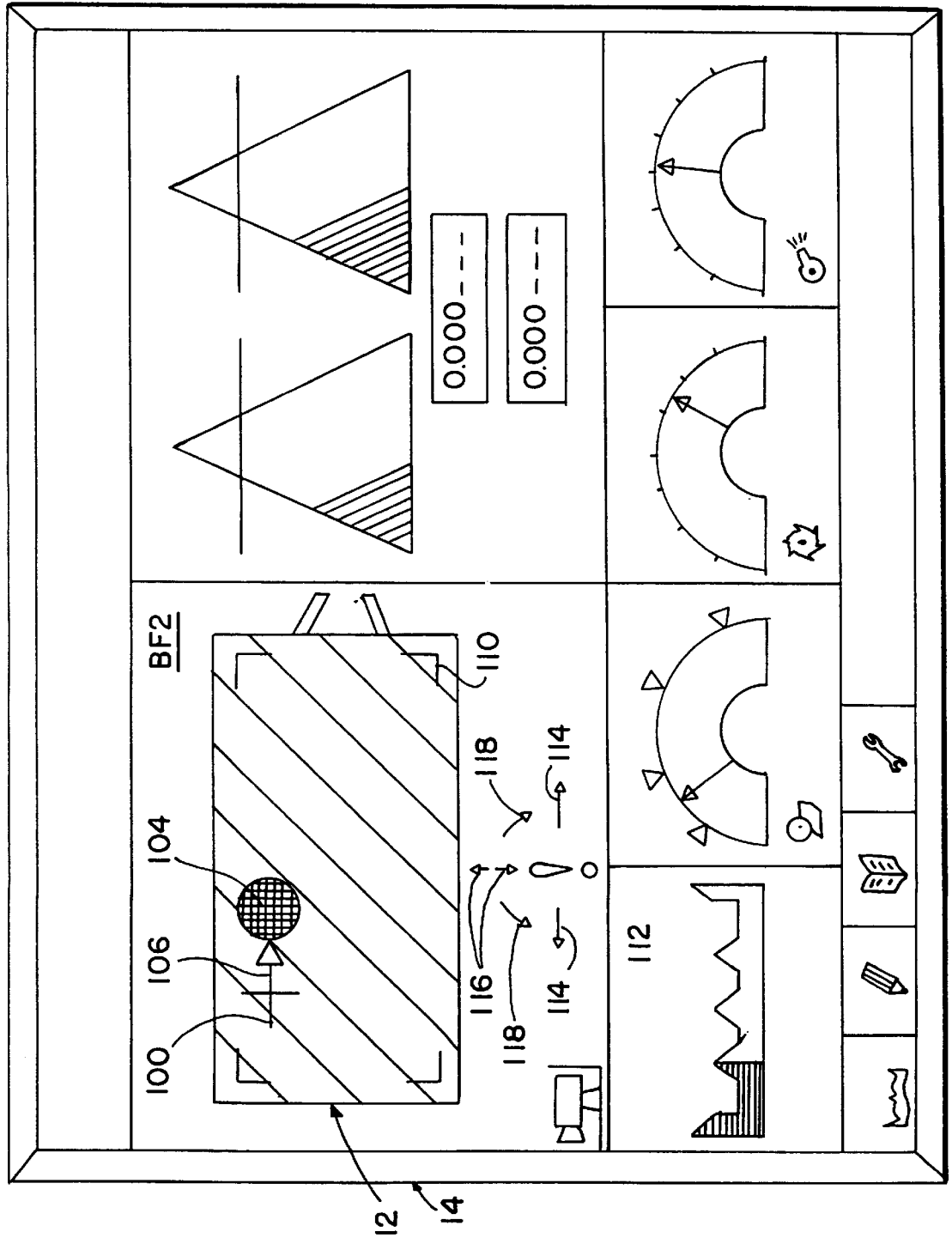
FIG. 4 is a view showing a possible graphic indicator in the working machine or the transporting vehicle in accordance with the present invention.

FIG. 4 indicates for example a graphic indicator on the image screen 58, as known in principle from the German patent document DE 43 41 834. The specifics here is that, in the image field PF2 the digital video signals of a monitoring camera 16 are represented. The loading surface of the trailer 12 is clearly recognized by hatching. The impact point of the overloading product under the overloading device can be identified in the graphic indicator by a symbol 100. Thereby the driver of the working machine 2 of a transporting vehicle 10 can quickly recognize which region of the trailer 12 is filled directly by the overloading device.

In addition to the pure indication of the digitalized video signal of the image screen 58, it is naturally also possible to provide the image signal with additional informations by a software-supported image evaluation which can be carried out by the microprocessor M2 and M3. By a comparison of the color value of the individual image points of the digitalized video signal, it is possible to recognize the contour of the trailer 12. The contour of the trailer 12 can be illustrated by the corner angle 110 shown in the graphic indicator, which guarantees a safety distance to the board wall of the trailer 12. In the case of deviation of the impact point 100 from the region identified by the corner angle 110 the working signal 112 can be provided for example with an acoustic alarm for the driver about possible overloading loss. The electronic system of the image evaluation can propose with the arrow symbols 114 to increase or decrease the traveling speed by the arrow symbols 116 to change the throwing width of the overloading device, and by the arrow symbols 118 to change the turning angle of the overloading device. With the use of an image evaluation system the driver no longer has to convert the visual information into control commands to the overloading device or the machine driven by it, but instead he must only execute the proposed adjusting command. It can be provided that the adjusting commands are given not by the driver of the working machine 2 but instead by the driver of the transporting vehicle 10 through telecommunication means when for example the driver of the working machine must or want to fully concentrate on its working process. With the use of the proposal symbols for the overloading control the indicator of the digitalized video signals of the monitoring camera serve only for the control. Instead of carrying out the control commands by the driver, it is naturally also possible that the electronic system of the image evaluation transmits the control commands automatically to the actuator 54 connected with the CAN-bus network 5.

In order to reduce the data quantity which is supplied by the microprocessor M2 in the CAN-bus network 50, it is advantageous when the electronic system for the image evaluation is arranged either in the camera 16 or in the microprocessor M2. The digitalized video signals of the monitoring camera 16 can be reduced by the software of the image evaluation either to the outputting of the adjustment symbols 104–118, the proposal symbols 104 and/or to simplify symbol representation of the trailer 12 and the impact point 100. In such an arrangement it is no longer necessary to transmit the normal data quantities of the video signal in real time, but only to less signals which turn on or turn off the adjusting symbols or control the symbol representation of the trailer 12 and the impact point 100.

Such a reduction of the digitalized video signals to a few control-relevant values is especially advantageous when the graphic indicator utilizes a relatively slowly reacting and coarse-grid black-white liquid crystal image screen which is however very cost favorable.

It is also recommended to monitor the filling not only by the monitoring camera 16 and an associated image evaluation, but also additionally or instead by optical, acoustic, or radiation sensors. When a software determines from the data of the sensors which are available, that is favorable for the filling of the trailer 12 when the impact point 100 is located at another point of the trailer, then a symbol 104 can be introduced in the digitalized video signal which identifies the new proposed favorable impact point. The relative positioning of the overloading device to the trailer 12 which is required for providing the new impact point can be additionally represented by a vector 106.

It will be understood that each of the elements described above, or two or more together, may also find a useful application in other types of constructions differing from the types described above.

While the invention has been illustrated and described as embodied in device for monitoring overloading of products for working machine to transporting vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for overloading products from a working machine having a driver's stand to a transporting vehicle, comprising an overloading unit provided in the working machine; and means for monitoring overloading of the product from the working machine to the transporting vehicle, said monitoring means including an analog monitoring camera associated with said overloading unit and filming an overloading process, an analog control monitor arranged in the driver's cabin of the working machine such that an indication of said monitoring camera is performed by said control monitor, a first microprocessor connected to said monitoring camera and digitalizing a video signal, a second microprocessor to which said video signal is transmitted; and a digitally operating graphic indicator to which the digitalized video signal is transmitted by said second microprocessor for indication, said monitoring means including a board computer of the working machine provided with a digital parallel bus, said first microprocessor transmitting the digitalized video signal of said monitoring camera in a standard format on the basis of said digital parallel bus of said board computer and telecommunication means for making ready and transmitting the digitalized video signal from said board computer to signal processing means on board the transporting vehicle.

2. A device as defined in claim 1, wherein said digitally operating graphic indicator is formed so that it indicates at least operational control data of the working machine.

3. A device as defined in claim 1, wherein said digitally operating graphic indicator is formed so that it indicates at least control data of the working machine.

4. A device as defined in claim 1, wherein said digitally operating graphic indicator is formed so that it indicates operational data and control data of the working machine.

5. A device as defined in claim 1, wherein said digital parallel bus is formed as a PCMCIA connector.

6. A device as defined in claim 1, wherein said graphic indicator has a window in which the digitalized video signal is indicatable.

7. A device as defined in claim 1, wherein said monitoring means include a plurality of said monitoring cameras, providing a plurality of video signals from which the digitalized video signal is selected on said digitally operating graphic indicator.

8. A device as defined in claim 1, wherein said monitoring means include a plurality of said monitoring cameras providing a plurality of said digitalized video signals which are indicated in windows of said graphic indicator.

9. A device as defined in claim 1, wherein said second microprocessor is provided with a standard interface which, in addition to the digitalized video signals, also transmits sensor data of the working machine to said digitally operating graphic indicator.

10. A device as defined in claim 1, wherein said second microprocessor is provided with a standard interface which, in addition to the digitalized video signals, also transmits operating data of the working machine to said digitally operating graphic indicator.

11. A device as defined in claim 1, wherein said second microprocessor is provided with a standard interface which, in addition to the digitalized video signals, also transmits sensor and operation data of the working machine to said digitally operating graphic indicator.

12. A device as defined in claim 1, wherein said monitoring means include a third microprocessor with which said first microprocessor is directly connected so that the video signals of the monitoring camera are transmitted to said second microprocessor.

13. A device as defined in claim 1, wherein said monitoring means include a third microprocessor in which said first microprocessor is integrated so that said video signals of said monitoring camera are transmitted to said third microprocessor.

14. A device as defined in claim 1, wherein said monitoring means include a fourth microprocessor with which said first microprocessor is directly connected so that the video signals of said monitoring camera are transmitted to said fourth microprocessor.

15. A device as defined in claim 1, wherein said monitoring means include a fifth microprocessor with which said first microprocessor is directly connected so that the video signals of the monitoring camera are transmitted to said fifth microprocessor.

16. A device for overloading products from a working machine having a driver's stand to a transporting vehicle, comprising an overloading unit provided in the working machine; and means for monitoring overloading of the product from the working machine to the transporting vehicle, said monitoring means including an analog monitoring camera associated with said overloading unit and filming an overloading process, an analog control monitor arranged in the driver's cabin of the working machine such that an indication of said monitoring camera is performed by said control monitor, a first microprocessor connected to said monitoring camera and digitalizing a video signal, a second microprocessor to which said video signal is transmitted; and a digitally operating graphic indicator to which the digitalized video signal is transmitted by said second microprocessor for indication, said monitoring means including telecommunication means through which a board electronic system of the working machine transmits the digitalized video signals about a working process to one or several transporting vehicles, said telecommunication means making ready the digitalized video signals of the board electronic system, and the indication of the digitalized video signals being performed on the digitally operating graphic indicator of one of the transporting vehicles.

17. A device as defined in claim 16, wherein said monitoring means is provided on the transporting vehicle.

18. A device as defined in claim 16, wherein said monitoring means include input means through which a control electronic system of the transporting vehicle is available, and telecommunication means arranged so that control commands of a driver of a transporting vehicle are transmittable from said input means to said overloading unit of the working machine through said telecommunication means on a board electronic system on the working machine for execution.

19. A device as defined in claim 18, wherein said input means is formed as attached image screen with a graphic consumer surface.

20. A device as defined in claim 18, wherein said input means is formed as a keyboard.

21. A device as defined in claim 20, wherein said monitoring means include a decoder which converts the digital video signal of said monitoring camera in a standard format for a bus network.

22. A device as defined in claim 16, wherein said monitoring camera is formed so that it provides a digital video signal.

23. A device as defined in claim 16, wherein said monitoring means include a decoder which converts the digital video signal of said monitoring camera in a standard format for a vehicle computer.

24. A device as defined in claim 16, wherein said monitoring means is formed so that the digital video signal is indicated only on at least one transporting vehicle.

25. A device as defined in claim 16, wherein said telecommunication means is operative for transmitting the digitalized video signals about a working process including an information selected from the group consisting of switching on and switching off of working organs of the working machine, transferring elements, steering movements of the working machine as a whole and turning movements of the transferring elements, a traveling speed of the working machine, and sensor data for properties of overloading products.

26. A device for overloading products from a working machine having a driver's stand to a transporting vehicle, comprising an overloading unit provided in the working machine; and means for monitoring overloading of the product from the working machine to the transporting vehicle, said monitoring means including an analog monitoring camera associated with said overloading unit and filming an overloading process, an analog control monitor arranged in the driver's cabin of the working machine such that an indication of said monitoring camera is performed by said control monitor, a first microprocessor connected to said monitoring camera and digitalizing a video signal, a second microprocessor to which said video signal is transmitted; and a digitally operating graphic indicator to which the digitalized video signal is transmitted by said second microprocessor for indication, said digitally operating graphic indicator being formed so that it includes an impact point of an overloading product, said monitoring means including telecommunication means for making ready and transmitting the digitalized video signal to signal processing means on board the transporting vehicle.

27. A device as defined in claim 26, wherein said monitoring means include means for forming an image evaluating software which processes the video signals of said monitoring camera.

28. A device as defined in claim 26, wherein said digitally operating graphic indicator is formed so that it indicates data derived from the digitalized image signals.

29. A device as defined in claim 28, wherein said digitally operating graphic indicator indicates said data selected from the group consisting of vectors, corner angles, warning symbols, arrow symbols, a symbolic representation, and an adjusting command proposal.

30. A device as defined in claim 26, and further comprising means for automatically carrying out an adjusting command proposal by a board electronic system.

31. A device as defined in claim 26, wherein said monitoring means include a third microprocessor, and image evaluation means so that the digital video signals outputted by said first microprocessor is reduced by said image evaluating means to a symbolic representation selected from the group consisting of impact point symbols, proposal symbols, vectors, corner angles, warning symbols, and arrow symbols.

32. A device as defined in claim 31, wherein said image evaluating means is associated with said monitoring camera.

33. A device as defined in claim 31, wherein said image evaluating means is associated with said first microprocessor.

34. A device as defined in claim 31, wherein said monitoring means include a bus network to which said first microprocessor outputs said digital video signals.

35. A device as defined in claim 31, wherein said monitoring means includes a third microprocessor to which said first microprocessor outputs said digital video signals.

36. A device as defined in claim 26, wherein said digitally operating graphic indicator transmits from a microprocessor data which are derived from an evaluation of sensor data.

37. A device as defined in claim 36, wherein said digitally operating graphic indicator transmits the data which include symbolic representations.

38. A device as defined in claim 36, wherein said digitally operating graphic indicator transmits the data which includes adjusting command proposals.

39. A device as defined in claim 36, wherein said digitally operating graphic indicator transmits the data which are derived from the evaluation of the sensor data together with an image evaluation.

40. A device for overloading products from a working machine having a driver's stand to a transporting vehicle, comprising an overloading unit provided in the working machine; and means for monitoring overloading of the product from the working machine to the transporting vehicle, said monitoring means including an analog monitoring camera associated with said overloading unit and filming an overloading process, an analog control monitor arranged in the driver's cabin of the working machine such that an indication of said monitoring camera is performed by said control monitor, a first microprocessor connected to said monitoring camera and digitalizing a video signal, a second microprocessor to which said video signal is transmitted; and a digitally operating graphic indicator to which the digitalized video signal is transmitted by said second microprocessor for indication, said monitoring means including a board computer of the working machine provided with a serial bus system, said working microprocessor transmitting the digitalized video signal of said monitoring camera in a standard format on the basis of said serial bus system of said board computer, said monitoring means including telecommunication means for making ready and transmitting the digitalized video signal from said board computer to signal processing means on board the transporting vehicle.

41. A device for overloading products from a working machine having a driver's stand to a transporting vehicle, comprising an overloading unit provided in the working machine; and means for monitoring overloading of the product from the working machine to the transporting vehicle, said monitoring means including an analog monitoring camera associated with said overloading unit and filming an overloading process, an analog control monitor arranged in the driver's cabin of the working machine such that an indication of said monitoring camera is performed by said control monitor, a first microprocessor connected to said monitoring camera and digitalizing a video signal, a second microprocessor to which said video signal is transmitted; and a digitally operating graphic indicator to which the digitalized video signal is transmitted by said second microprocessor for indication, said monitoring means including a board computer of the working machine provided with a CAN-BUS system, said working microprocessor transmitting the digitalized video signal of said monitoring camera in a standard format on the basis of said CAN-BUS system of said board computer, said monitoring means including telecommunication means for making ready and transmitting the digitalized video signal from said board computer to signal processing means on board the transporting vehicle.

* * * * *